United States Patent Office 3,839,551
Patented Oct. 1, 1974

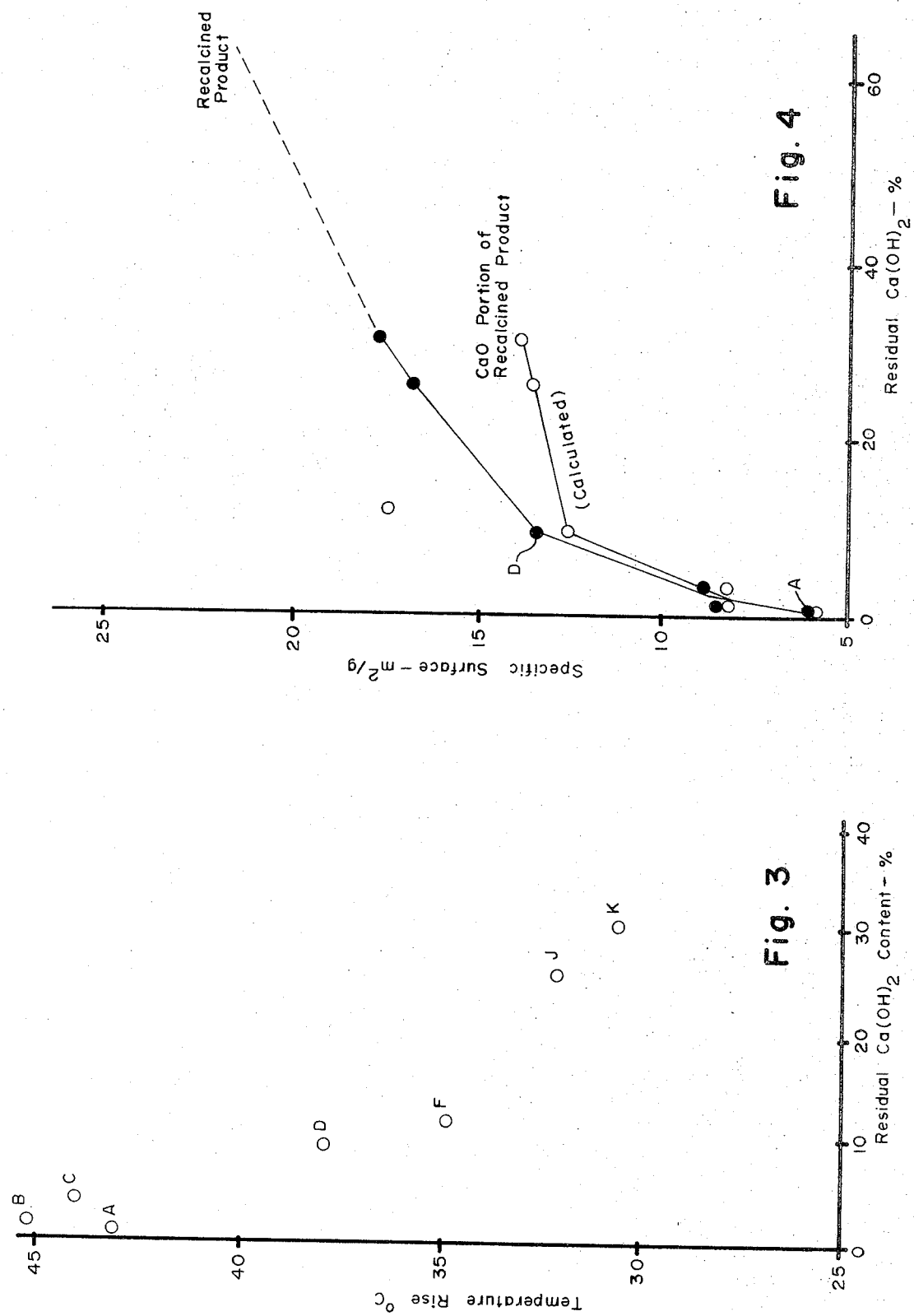

3,839,551
SUPER REACTIVE RECALCINED LIME PRODUCT AND PROCESS
Otto L. Dozsa, Palos Heights, and Byron E. Powell, Rolling Meadows, Ill., assignors to United States Gypsum Company, Chicago, Ill.
Filed July 21, 1972, Ser. No. 273,895
Int. Cl. C01f 11/02
U.S. Cl. 423—640         7 Claims

ABSTRACT OF THE DISCLOSURE

A very water-reactive recalcined quicklime product is disclosed that is characterized by its very low residual $Ca(OH)_2$ content and more favorable pore volume and pore size distribution. Preferably the product is in the form of an agglomerated pellet and is made by admixing hydrated lime with sufficient water to agglomerate; and then recalcining at a temperature between about 800–1000° C. to drive out free and combined water until the sum of $CO_2$ and $H_2O$ remaining in the product is less than about 2%.

BACKGROUND OF THE INVENTION

This invention concerns an improved lime product, and more particularly a very highly reactive, double calcined or reburned, quicklime and a process for its production in a highly pure form.

Quicklime (CaO) is a material which may or may not be very highly reactive with water, generating considerable heat in the hydration process; and therefore considered suitable for use in many chemical processes calling for the use of a lime material. Quicklime enjoys expanded usage in chemical and industrial processes, however, both reactivity of quicklime and purity of quicklime is becoming more critical in many applications, such as in the basic oxygen steel industry, petrochemical industry, and food additives industries that are now placing a premium upon obtaining more reactive and higher purity quicklime products. Commercial producers of lime are often penalized if reactivity or purity falls below certain levels, and there is a need to develop lime products having even greater reactivity levels and purities.

Reactivity of lime is referred to as its slaking rate. On slaking, quicklime reacts with water with the liberation of heat according to the equation:

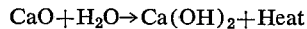

$$CaO + H_2O \rightarrow Ca(OH)_2 + Heat$$

Thus slaking rate denotes the period of time required for quicklime to completely react with water.

Various standard tests have been devised to compare the reactivities of different quicklimes. For example, the American Society for Testing and Materials (ASTM) has provided standard methods to measure reactivities, see particularly ASTM method C 110–71. Further it is well known that density, porosity, pore size and pore distribution exert profound influences on the reactivity of quicklime. See, for example, Boynton, *Chemistry & Technology of Lime and Limestone*, p. 146, 1966.

In conventional calcining practices, high reactivity in quicklime is generally achieved by heating the quicklime source at relatively low temperatures. During calcination, the intensity of the calcination (mainly time and temperature factors) affects the shrinkage of the quicklime source, and also its porosity. Thus, generally a "hard burned" quicklime source undergoes more shrinkage and produces a denser product that is also less active chemically. Heretofore various methods have been proposed in attempts to produce a quicklime having increased reactivity; but generally these attempts do not appear to have been successful in providing a satisfactory product and there is a need for additional products.

One such attempt is via a recalcination, or reburning, process such as that set forth in Lovell et al. U.S. 2,474,207. This patent discloses reacting calcium oxide, previously prepared from the carbonate, with water; and then calcining at a temperature between 600–800° C. until about 10–20% of the hydrate is left in the product. According to this patent, in order to obtain a more highly reactive quicklime, the recalcined product should consist of about 15% calcium hydroxide, the balance being calcium oxide and normal impurities. According to this patent, if the material is completely calcined to the oxide, a lime product is produced that is not better than the commercial grade.

SUMMARY OF THE INVENTION

It is therefore one object and advantage of the present invention to provide a very highly reactive lime product.

Another object is the provision of a very highly reactive quicklime product that has high purity.

A further object is the provision of a very highly reactive quicklime product that has higher specific surface areas, more favorable pore size distribution and pore shape configurations than the regular quicklime from which it is made.

A further object is the provision of a very highly reactive quicklime by a double calcination or reburning process, which quicklime is characterized in containing less than about 2% residual calcium hydroxide.

A still further object is the provision of processes for production of such quicklime, including a process for providing such a product in agglomerated form.

The fulfillment of these and other objects and advantages of the present invention are accomplished by agglomerating a hydrated lime; and heating the agglomerated material at a temperature between about 800–1000° C. until the sum of carbon dioxide and water left in the product reaches a level of less than about 2%, and preferably about 1%. As an alternative embodiment, the starting material may be any quicklime which is slaked with water to the hydroxide, or hydrated lime, state; successively screened and filtered to remove impurities and to produce a high purity hydrated lime; and then proceeding as set forth hereinabove to produce a very high purity product. The reactivity of the agglomerated recalcined product is dramatically higher than the reactivity of a conventionally produced quicklime, as expressed in reactivity indices. Further, the reactivity of the agglomerated recalcined product is independent of the reactivity of the original quicklime from which it was made.

BRIEF DESCRIPTION OF THE DRAWINGS

FIG. 3 illustrates temperature rise in 30 seconds of materials having differing calcium hydroxide contents; and FIG. 4 illustrates specific surface areas materials having differing calcium hydroxide contents.

DESCRIPTION OF THE PREFERRED EMBODIMENTS

This invention is based in part on the surprising discovery that a very water reactive reburned lime product can be obtained without requiring high residual calcium hydroxide contents on the order of 10–15% by weight. The finding of high reactivity with low residual calcium hydroxide, also definable as the sum of $CO_2$ and $H_2O$ remaining, products appear to be characterized by increased pore volume and favorable pore size distribution in the product particles.

Figure 1:
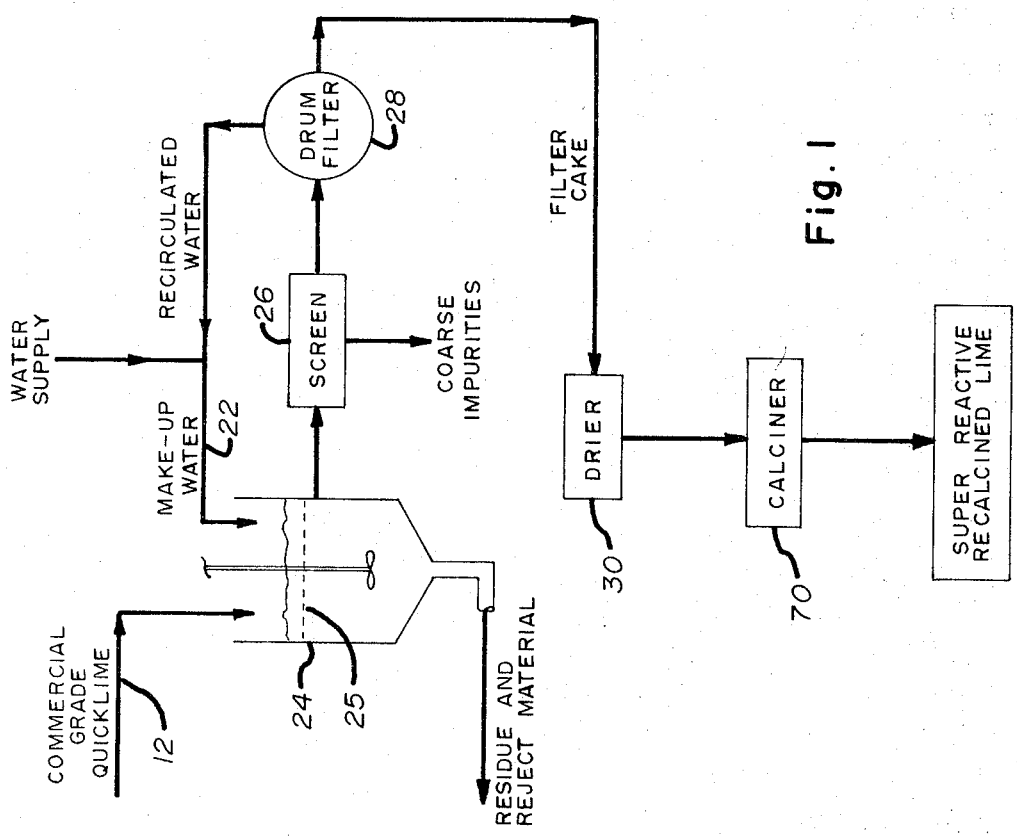
FIG. 1 is a schematic illustration of the processes of the invention.

Turning now to FIG. 1, there is illustrated in a schematic fashion a highly preferred embodiment for the process of making the agglomerated recalcined product starting with a conventionally produced quicklime. The machinery depicted in FIG. 1 is conventional and illustrative only, there being a wide variety of apparatus which can perform the steps of the process. In this process as depicted in FIG. 1, commercial quicklime 12 is fed, along with make-up water 22 into a suitable mixer 24 which is a conventional lime slaker optionally equipped with a coarse screen 25. The quicklime is slaked with an excess of water to a water-solids ratio which will assure by mild agitation a separation of any uncalcined particle and overburned or other non-slakable residue and easy rejection of them. The resultant milk of lime is then passed through a screen 26 to remove coarse impurities. By selecting the appropriate screening size, the degree of removal of impurities can be easily regulated. Generally it is preferred that a screen of U.S. Standard mesh rating of No. 30 be used, but screens of somewhat larger or smaller mesh may be used conveniently. Much smaller mesh screens may be used, but if the screen openings are too small the material may tend to pass through at rates too slow for economical production. The milk of lime is then filtered, such as by drum filter 28 and formed into a filter cake and passed through a drier 30. In an optional alternative, the material passing the filter 28 may then pass into a screw extruder and then into drier 30.

Thereafter, the dried filter cake or dried uniformly sized extruded pellets are fed to a calciner 70 which is any conventional furnace or the like operating in the 800–1000° C. range for recalcination of the agglomerated product. The length of time and temperature of recalcination is governed by the thickness of the agglomerated product. No differences were observed in the reactivity of the final product if the recalcination is kept in the before-mentioned temperature range.

The product so produced is characterized in its uniformity in size, high reactivity with water and high purity, and by its large void volume. Because of its very high surface area due to combined favorable pore volume and pore size distributions, the resultant product undergoes instantaneous reaction with water. The product contains a very large volume of voids which are of such a small size that they may be considered pores rather than voids.

The calcination method described above produces an agglomerated recalcined lime product having a pore volume of about 1.677 cc. per gram and average pore size of about 1.44 microns. It should be noted that high residual calcium hydroxide was not required in order to obtain high lime reactivity.

EXAMPLE 1

Pulvized quicklime having an average pore size of 1.36 microns was slaked using a water to lime ratio of 6.35 to 1. The slaked slurry was vacuum filtered through a filter cloth leaving an approximately $7/_{32}$ inch thick cake on the filter cloth. The filter cake was dried overnight at 100° C. in an electric drying oven to eliminate free water as shown by reaching a constant weight. At constant weight there was a weight loss of 42.6% from the filtered cake. The cake was then crushed and sieved through a U.S. Standard 6 mesh screen. Particles of —6 mesh dried filter cake, in 160 gram batches, were calcined at 900° C. in an electric muffle furnace.

The calcinations were terminated upon predesignated weight losses, to result in residual calcium hydroxide contents, as set forth in Table 1. The recalcined samples were analysed for percentage loss on ignition (% LOI) and specific surface areas were determined for the samples by a standard nitrogen absorption method, generally known as the B.E.T. method, the results of which are set forth in Table 1. The recalcined samples were then evaluated for reactivity according to ASTM C 110-58, with the results as set forth in Table 2.

Figure 2:
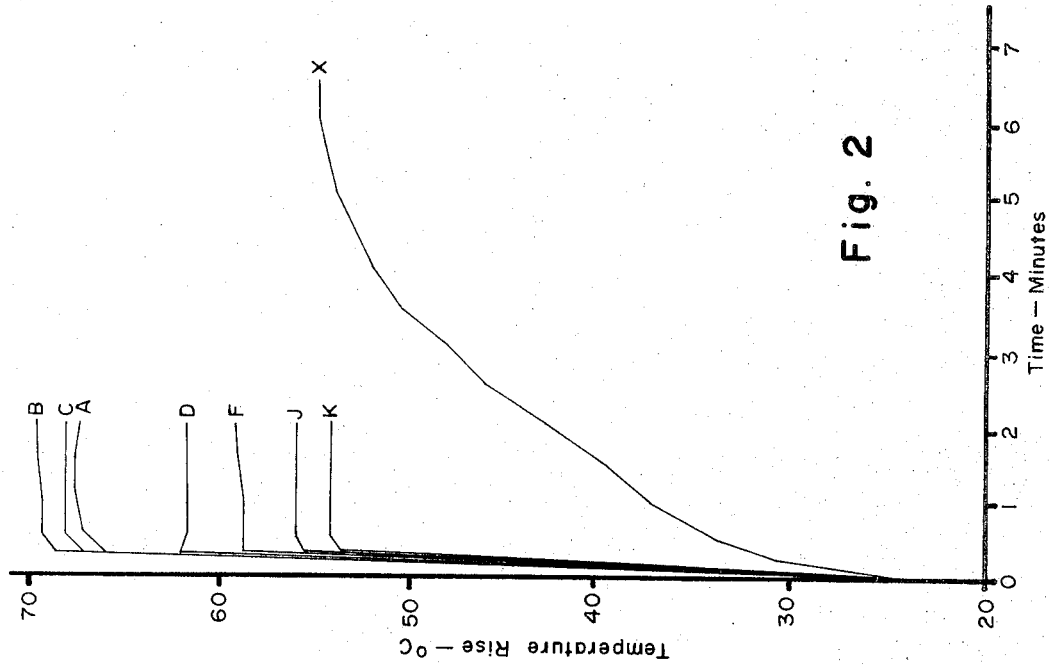
FIG. 2 illustrates slaking rates of materials having differing calcium hydroxide contents.

FIG. 2 set forth the slaking curves (temperature rise) of each of the samples. All of the recalcined samples reacted violently with the water and completed slaking within thirty seconds, as set forth in Table 2. Plotting the temperature rises, in FIG. 3, shows an almost straight dependence upon calcium oxide content of the samples, indicating that the reactivity of the calcium oxide portion of the recalcined product is not affected by the amount of residual calcium hydroxide content.

In U.S. Pat. 2,474,207 "reactivity" was measured by absorbing a dye from a solution in which the product was soluble to obtain absorption numbers which were related to the external and capillary surface of the products. This was not a measure of reactivity but rather of specific surface area. In comparison, in the samples of the present invention the more accurate B.E.T. specific surface area measurement was used; the results as set forth in Table 1 and in FIG. 4 which illustrates the B.E.T. specific surfaces of the recalcined samples.

TABLE 1

| Sample | Calcination Temp., °C. | Time, minutes | Sample, weight-grams Before calcination | After calcination | Percent weight loss | Percent LOI | Percent Ca(OH)₂ | B.E.T. surfaces, m.²/g. |
|---|---|---|---|---|---|---|---|---|
| A | 900 | 120 | 159.98 | 118.32 | 41.66 | 0.20 | 0.82 | 6.05 |
| B | 900 | 75 | 159.72 | 118.13 | 41.59 | 0.40 | 1.64 | 8.60 |
| C | 900 | 60 | 159.72 | 119.55 | 40.17 | 0.90 | 3.70 | 8.90 |
| D | 900 | 45 | 159.72 | 121.00 | 38.72 | 2.30 | 9.45 | 13.90 |
| F | 900 | 33 | 159.72 | 123.83 | 35.89 | 2.90 | 11.92 | 17.50 |
| J | 900 | 25 | 160.00 | 128.19 | 31.81 | 6.33 | 26.02 | 16.80 |
| K | 900 | 23 | 160.00 | 129.84 | 30.16 | 7.51 | 30.87 | 17.70 |
| X | Quicklime, not recalcined. | | | | | 6.50 | | 4.35 |
| H | Dried hydrate, made from Sample X, not recalcined. | | | | | 25.70 | 98.62 | 26.10 |

TABLE 2.—SLAKING RATES OF SAMPLES (ASTM C110-58)

| Time, minutes: | Temperature rise, °C. of— | | | | | | | |
|---|---|---|---|---|---|---|---|---|
| | X | A | B | C | D | F | J | K |
| 0.0 | 24.0 | 24.0 | 24.0 | 24.0 | 24.0 | 24.0 | 24.0 | 23.75 |
| 0.25 | 31.0 | 66.0 | 68.5 | 67.0 | 62.0 | 58.75 | 55.5 | 53.5 |
| 0.5 | 34.0 | 67.0 | 69.25 | 68.0 | 61.75 | 58.75 | 56.0 | 54.25 |
| 1.0 | 37.5 | 67.5 | 69.25 | 68.0 | 61.75 | 58.75 | 56.0 | 54.25 |
| 1.5 | 40.0 | 67.5 | 69.5 | 68.0 | 61.75 | 59.0 | 56.0 | 54.25 |
| 2.0 | 43.0 | 67.25 | 69.5 | 68.0 | 61.75 | 59.25 | 56.0 | 54.25 |
| 2.5 | 46.0 | | | | | | | |
| 3.0 | 48.0 | | | | | | | |
| 3.5 | 50.5 | | | | | | | |
| 4.0 | 52.0 | | | | | | | |
| 4.5 | 53.0 | | | | | | | |
| 5.0 | 54.0 | | | | | | | |
| 5.5 | 54.5 | | | | | | | |
| 6.0 | 55.0 | | | | | | | |
| 6.5 | 55.0 | | | | | | | | as a function of residual calcium hydroxide content. For FIG. 4, the B.E.T. surface areas of the calcium oxide portions of certain of the recalcined samples were calculated from the B.E.T. surface area of the particular sample and from that of the dried calcium hydroxide cake used for the preparation of that sample. The calculated values are plotted in FIG. 4; the lower curve representing the B.E.T. surface areas of the calcium oxide component. The curve in FIG. 4 agrees with the finding in U.S. 2,474,207 that the specific surface area takes a rather sharp decrease at about the 10% residual calcium hydroxide content. The lower curve indicates that the higher the residual calcium hydroxide content, the more the calcium hydroxide contributes to the increased specific surface area of the recalcined total product.

From these results it appears that high specific surface area does not necessarily mean high reactivity. A given specific surface area does not necessarily mean high reactivity. A given specific surface area can be coupled with various pore size distribution and pore shape configurations, each providing different accessibility for liquids.

EXAMPLE 2

For comparison, samples A, D and X were evaluated for pore volume and average pore size by the mercury penetration method on a Micromeritics' Porosimeter. In general, this method measures the quantity of mercury that can be forced into pores at various increasing pressures; and the shape of the pores is determined by quantitatively measuring the amount of mercury expelled from the pores at decreasing pressures; as more particularly set forth in *Research/DeDvelopment*, Sept. 1970, volume 21, #9, pages 59–62, "Micrometrics" by F. W. Karasek and in *Power Technology*, 1969/70;; volume 3; pages 117–123 "Application of Mercury Penetration to Materials Analysis" by C. Orr, Jr. These results are set forth in Table 3.

TABLE 3

| Sample | Pore volume (cc./g.) | Average pore size (microns) |
|---|---|---|
| A | 1.677270 | 1.44 |
| D | 1.699659 | 1.78 |
| X | 0.731043 | 1.36 |

From Table 3 it can be seen that the original quicklime that was not recalcined had the smallest pore volume. By recalcining to a residual calcium hydroxide content of about 10%, the pore volume was increased yet the average pore size had also increased, indicating that the average individual pore was much larger. By continuing the recalcination until the residual $Ca(OH)_2$ content was less than about 1%, it is seen from Table 3 that the average pore size was very much smaller and begins to approach the average pore size of the original quicklime; yet the higher pore volume is being maintained. This would account for the explosive reactivity characteristics of the novel recalcination product here. Even though the product of this application has very low residual calcium hydroxide, it has about the same pore volume as the sample containing about 10% residual calcium hydroxide. Although, in comparison, the surface area decreased, the pore volume did not substantially decrease.

While the present invention has been described and exemplified with respect to certain embodiments, it is not to be considered limited therto, and it is understood that variations and modifications thereof, obvious to those skilled in the art, may be made without departing from the spirit of scope of this invention.

What is claimed is:

1. A very water-reactive recalcined quicklime composition which obtains a temperature rise in water of about 40° C. during the first 30 seconds, comprising reburned calcium oxide having a pore volume of about 1.67 cc. per gram and an average pore size of about 1.4 microns; and having a sum of $CO_2$ and $H_2O$ less than about 2% by weight.

2. The composition of Claim 1 in which the sum of $CO_2$ and $H_2O$ is about 1% by weight.

3. The composition of Claim 1 in which the pore volume is 1.67 cc. per gram.

4. The composition of Claim 1 in which the average pore size is 1.4 microns.

5. A method of producing a very water-reactive lime product which obtains a temperature rise in water of about 40° C. during the first 30 seconds, comprising the steps of:
   mixing hydrated lime with sufficient water for agglomeration;
   agglomerating the hydrated lime; and
   calcining at a temperature between about 800–1,000° C. until the sum of $CO_2$ and $H_2O$ remaining is less than about 2% by weight.

6. The method of Claim 5, using quicklime as the starting material, which includes the additional steps of:
   slaking the quicklime with sufficient water to result in hydrated lime; and
   successively screening and filtering the hydrated lime to remove impurities.

7. The method of Claim 5 in which the agglomerated hydrated lime is calcined until the sum of $CO_2$ and $H_2O$ remaining is about 1% by weight.

References Cited
UNITED STATES PATENTS
2,474,207   6/1949   Lovell et al. _____ 423—635

OSCAR R. VERTIZ, Primary Examiner

B. E. HEARN, Assistant Examiner

U.S. Cl. X.R.
423—635

UNITED STATES PATENT OFFICE
CERTIFICATE OF CORRECTION

Patent No. 3,839,551      Dated October 1, 1974

Inventor(s) Otto L. Dozsa & Byron E. Powell

It is certified that error appears in the above-identified patent and that said Letters Patent are hereby corrected as shown below:

Column 5, line 49, the literature citation portion reading "Research/DeDvelopment" should read -- Research/Development --.

Column 5, line 51, the literature citation portion reading "Power Technology, 1969/70;;" should read -- Powder Technology, 1969/70; --.

Column 6, line 28, the terms "of scope" should read -- or scope --.

Signed and sealed this 3rd day of December 1974.

(SEAL)
Attest:

McCOY M. GIBSON JR.
Attesting Officer

C. MARSHALL DANN
Commissioner of Patents